Jan. 28, 1969     H. BILDSTEIN ETAL     3,424,564
METHOD FOR THE EXTRACTION OF MATERIALS
EMBEDDED IN A GRAPHITE BODY
Filed June 28, 1966
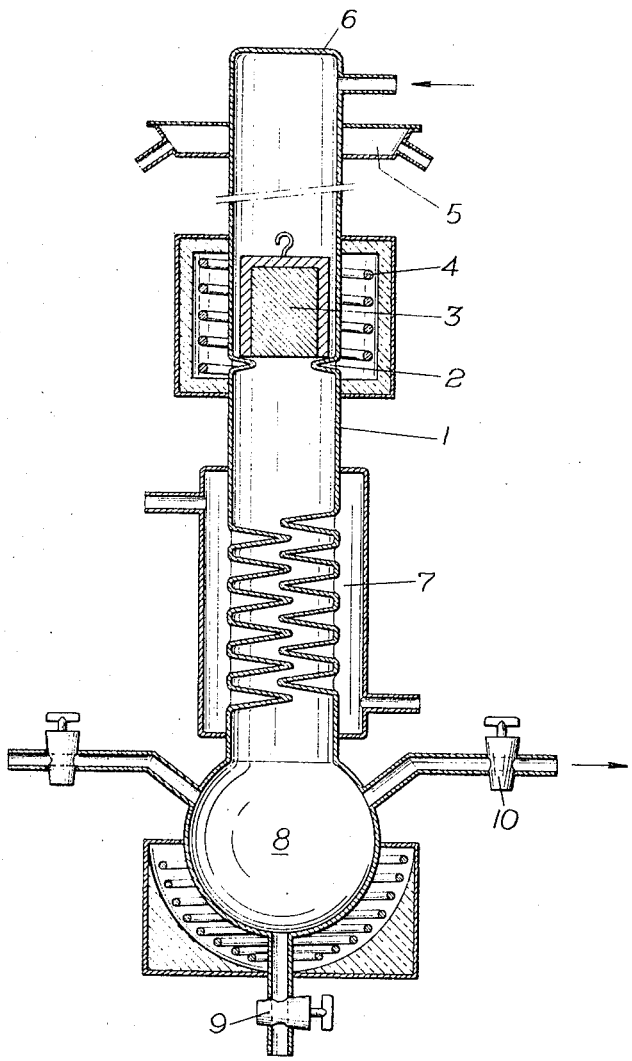
INVENTORS
HUBERT BILDSTEIN
GERHARD STOLBA
KARL KNOTIK
By: M Gleen and Toren
ATTORNEYS

United States Patent Office 3,424,564
Patented Jan. 28, 1969

3,424,564
METHOD FOR THE EXTRACTION OF MATERIALS EMBEDDED IN A GRAPHITE BODY
Hubert Bildstein and Gerhard Stolba, Vienna, and Karl Knotik, Siegendorf, Austria, assignors to Osterreichische Studiengesellschaft fur Atomenergie Ges.m.b.H., Vienna, Austria
Filed June 28, 1966, Ser. No. 561,109
Claims priority, application Austria, July 2, 1965,
A 6,055/65
U.S. Cl. 23—324
Int. Cl. C01b *31/04*
11 Claims

ABSTRACT OF THE DISCLOSURE

A method for the extraction of materials from a graphite body, such as the recovery of fissile material and fission products from an irradiated graphite fuel element, is comprised of the steps of thermally shocking the graphite as required for removing any coating layers, heating the graphite body to below 350° C. and subjecting the graphite body to a vapor of a halogen or halogen compound for disintegrating or loosening the graphite body, preferably a vapor of bromide is used for this purpose, removing the halogen vapor and then subjecting the graphite body to another halogen or halogen compound vapor, preferably a vapor of chlorine for separating the material from the graphite. It is possible to utilize a vapor of an interhalogen compound, such as bromine chloride or iodine chloride, for both distintegrating the graphite body and removing the material from the graphite.

---

The invention concerns a method for the extraction of materials embedded in a graphite body, especially for the recovery of nuclear fuel.

Fuel charges, which consist of a moulded graphite body in which encased particles of material are dispersed or arranged in loose heaps, may be used for the operation of gas cooled high temperature reactors. These encased particles of material contain the actual nuclear fuel, for example uranium carbide or uranium oxide or mixtures of fissile or breeding materials such as uranium-thorium carbide or oxide and are spherical, mainly having a diameter from 300 to 500 $\mu$. Due to the coating layers of pyro-carbon or silicon carbide and the embedding of the particles in the graphite body on burning of the fuel, the escape of the built up fission products into the circulation of the cooling gas is prevented to large extent. Due to the high thermal and chemical resistance of graphite, pyro-carbon, and silicon carbide the spent fuel cannot be worked up or recovered by means of direct solvent reaction with acids. Above all else, the large amounts of carbon have to be removed, which, in the shape of graphite moulded bodies and pyro-carbon shells, prevents a reaction with the carbide cores.

The carbon can be removed in two stages: First the graphite moulded body is disintegrated by means of an anodic oxidisation in a suitable electrolyte, for example, 1 N to 8 N nitric acid, and the carbon of the matrix is separated from the "sheathed particles," by reason of its different density, by sedimentation. The shell layers of the particles are then destroyed. In the case of simple pyro-carbon shells the layers are destroyed by burning the coating, in the case of compound pyro-carbon-silicon carbide shells they are destroyed mechanically, for example in mills or by decomposition reactions in alkaline salt melts.

The object of the invention is to provide a simple method to remove and thus to recover embedded materials especially uranium and thorium from the moulded body. According to the invention, it is proposed that the graphite body be heated, preferably up to temperatures below 350° C. and be exposed to the steam of one or more halogens or halogen compounds, whereby the graphite body collapses and the embedded particles of material are separated.

If the particles of material are surrounded with coating layers, then it is suggested that the graphite body shortly before the destruction or the loose particles after the destruction of the body be heated up to temperatures of from 2500° C. to 3000° C. The heating up can take place within a period of from 10 to 20 minutes, for example in an inductively heated high temperature oven. The coating layers are thereby damaged to such an extent, partly by differential thermal expansion, partly due to the reaction of the core material with the materials of the coating that chemical attack on the core becomes possible, the core otherwise being protected by the layering. After cooling the graphite body is brought into the actual preparation plant.

The figure shows one form of experimental plant for carrying out the invention. It consists, in the main, of an upright quartz pipe 1, which is so indented in the centre 2 that a test container with the graphite body 3 may be inserted and supported in it. This part of the pipe can be heated to the temperatures required by means of a removable annular oven 4. The upper end 5 of the pipe is water cooled and carries an airtight lock 6. A cooler 7 which ends in a bulb 8 is provided on the lower end of the pipe. The bulb 8 has a downwardly directed drain cock 9 through which the solutions can be drained away and a laterally arranged cock 10 through which the chlorine gas flows away, which is filled in the apparatus through the inlet in the lock 6 at the upper end of the pipe 1.

One embodiment of the method according to the invention will now be described by way of example only with reference to a graphite body with fuel particles disposed therein. The thermally shocked graphite body, in a test container made of quartz glass is placed in the plant. The plant is filled with bromine vapour and closed and made airtight.

The graphite body is heated for about one hour at 200 to 300° C.

It is known that foreign ions can be disposed in the trellis layers of the graphite, graphite salts or acids then forming. (Martin W. H. Brocklehurst J. E., Carbon, 1, 133–141, 1964.) In the present case, formation of graphite-bromide takes place whereby the structure of the graphite layers is extensively loosened.

The graphite body expands due to the treatment with the bromine vapour and is thereby completely destroyed.

After the reaction the bromine vapour is pumped away and recovered by freezing.

The coating shells are torn open by the preceding heat treatment. If chlorine or a chlorine compound is now fed from top to bottom through the apparatus, and the central zone containing the material to be treated is heated up to temperatures between 600° and 1100° C., volatile compounds will be formed. Due to the strong exothermic reaction between uranium, thorium and the fission products with chlorine or the chlorine compound the thermally shocked coating breaks open completely and almost all chlorides sublimate into the cooled lower part of the tube 1 and into the bulb 8.

After about two hours the reaction is ended and the uranium and thorium removed except for the slightest traces. The container with the destroyed graphite body can now be removed from the plant. The chlorides remaining in the plant are dissolved by boiling with concentrated nitric acid in the bulb.

The solution contains the volatile chlorides of the nuclear fissile and breeding materials, uranium, thorium, plutonium as well as the fissile products zirconium, columbium, tellurium and cesium. The heavy volatile chlorides of rare earths and alkaline earth metals which likewise are present at the time as fission products are to be found in the removed container.

Chlorine vapour or an inert gas saturated with $CCl_4$ or nitrogen saturated with $CCl_4$ can be fed in as the reaction gas. Small amounts of a substance such as $S_2Cl_2$ aiding the formation of the volatile chlorides may be admixed.

The separation of the material from the carbon may however take place by other chemical means for example by chemical leaching with suitable acids.

The method according to the invention has been described herein with reference to nuclear fuel materials. It is however obvious that particles of other materials could be used treated by the same method. For example molybdenum particles which are coated with $Al_2O_3$ and embedded in graphite.

Compounds of bromine/carbon could be inserted for the destruction of the graphite body.

In the present case the destruction of the graphite body was caused by the vapour of elementary bromine. Similar results as with bromine have been obtained with fluorine and iodine. Apart from the elementary substances, the interhalogen compounds have also been used. The interhalogen compounds such as bromine chloride and iodine chloride showed especially good results. By use of interhalogen compounds it can also be arranged that the destruction of the graphite bodies and the formation of the chlorides of the fission materials or fissile products can be effected in one step.

The graphite moulded body does not always have to destroy itself during the treatment, complete destruction of the body can also take place after the treatment by the application of pressure. In any case during the treatment a loosening of the structure of the graphite moulded body takes place. In some cases it is sufficient if the structure is loosened to an extent sufficient to allow the reagent for formation of the compound with the nuclear fuel to penetrate into it.

What we claim is:

1. A method for the extraction of material embedded in a graphite body, as for example in the recovery of nuclear fuels from a graphite fuel element, comprising the steps of heating the graphite body to a temperature below 350° C., and subjecting the graphite body to a vapor of at least one of an elementary halogen taken from the group consisting of bromine, fluorine and iodine and a halogen compound wherein the compound consists of at least one halogen taken from the group consisting of bromine, fluorine and iodine whereby the graphite body breaks up and the embedded materials are removed.

2. A method as set forth in claim 1, wherein in the step of subjecting the graphite body to a vapor the graphite body is subjected to a vapor of at least one of elementary bromine and a bromine compound.

3. A method as set forth in claim 2, wherein the graphite body is subjected to a vapor of an interhalogen compound.

4. A method as set forth in claim 2, including the step of removing the embedded materials by subjecting the graphite body to at least one of a vapor of chlorine and a chlorine compound.

5. A method as set forth in claim 2, wherein the graphite body is subjected to a vapor of bromine for about one hour to break up the graphite coating, and then removing the bromine vapor.

6. A method as set forth in claim 5, comprising the further step of freezing the removed bromine vapor for recovering bromine.

7. A method as set forth in claim 5, comprising the further step of subjecting the graphite body to a vapor of chlorine after the removal of the bromine vapor.

8. A method as set forth in claim 5, comprising the further step of subjecting the graphite body to a vapor of one of an inert gas saturated with $CCl_4$ and nitrogen saturated with $CCl_4$ after the removal of the bromine vapor.

9. A method as set forth in claim 1, wherein the graphite body is coated with a material taken from the group consisting of pyrocarbon and silicon carbide and the coated bodies are first rapidly heated to a temperature ranging from between 2500° C. to 3000° C. for destroying the coating layers.

10. A method for the extraction of material embedded in a graphite body, as for example, in recovery of nuclear fuels, comprising the steps of heating the graphite body to a temperature below 350° and at the same time subjecting the graphite body to a bromine vapor, withdrawing the bromine vapor, then subjecting the graphite body to a chlorine vapor whereby chlorides of the material contained in the graphite body are formed.

11. A method as set forth in claim 10, comprising the step of thermally shocking the graphite body before the step of heating and subjecting the graphite body to the bromine vapor for the purpose of removing any coating layers thereon.

References Cited

UNITED STATES PATENTS

| 3,087,779 | 4/1963 | Johnson et al. | 23—324 |
| 3,219,408 | 11/1965 | Bradley et al. | 23—324 |
| 3,260,466 | 7/1966 | Wagner et al. | 176—91 S.P. |

OTHER REFERENCES

Reactor Fuel Processing (I), vol. 6, No. 2, April 1963, pp. 6 and 7.

Reactor Fuel Processing (II), vol. 8, No. 2, Spring, 1965, pp. 90 and 91.

BENJAMIN R. PADGETT, Primary Examiner.

R. L. GRUDZIECKI, Assistant Examiner.

U.S. Cl. X.R.

23—326